United States Patent
Naruto et al.

[19]

[11] Patent Number: 6,127,650
[45] Date of Patent: Oct. 3, 2000

[54] ELECTROMAGNETIC SWITCH AND WELDER USING THE SAME

[75] Inventors: Masafumi Naruto, Osaka; Yoshimichi Yasuhara, Ibaraki; Masayuki Okubo, Takatsuki, all of Japan

[73] Assignee: Matsushita Electric Industrial Co., Ltd., Osaka-fu, Japan

[21] Appl. No.: 09/196,224

[22] Filed: Nov. 20, 1998

[30] Foreign Application Priority Data

Nov. 21, 1997 [JP] Japan .................................. 9-320917
Nov. 21, 1997 [JP] Japan .................................. 9-320919

[51] Int. Cl.[7] .................................................. B23K 9/10
[52] U.S. Cl. ........................ 219/130.1; 219/132; 361/165
[58] Field of Search ............................. 219/132, 130.1, 219/137 PS; 361/140, 161, 162, 163, 165

[56] References Cited

U.S. PATENT DOCUMENTS

| | | | |
|---|---|---|---|
| 2,617,913 | 11/1952 | Oestreicher | 219/132 |
| 2,786,160 | 3/1957 | Bichsel | 219/130.1 |
| 3,391,333 | 7/1968 | Steinert et al. | 219/132 |
| 5,128,826 | 7/1992 | Yoneshige | 361/165 |

*Primary Examiner*—Clifford C. Shaw
*Attorney, Agent, or Firm*—Wenderoth, Lind & Ponack, L.L.P.

[57] ABSTRACT

A welder has an electromagnetic switch for turning on and off the power to be supplied to the welder, a control circuit for controlling the turn on and off of this switch according to a starter signal that starts the welder and self-holding circuit for self-holding the switch. This self-holding circuit releases the switch from the self-holding when a voltage of the control circuit lowers to not more than a turn-on voltage of the switch. Therefore, when an applied voltage decreases too low to maintain the turn-on status, the switch is released from its self-holding. A voltage can thus never be applied again to the control circuit unless the starter signal is once turned off. As a result, a coil of the switch is completely free from being burnt out. Also current can be cut off when a temperature of the coil of the switch rises to not less than a given value. Therefore, if an abnormal temperature of the coil is sensed, the coil current is cut off. As a result, the coil of the switch is completely free from being burnt out.

6 Claims, 8 Drawing Sheets

ELECTROMAGNETIC SWITCH AND WELDER USING THE SAME

FIELD OF THE INVENTION

The present invention relates generally to a welder, and more particularly to preventing an electromagnetic switch of the welder from being burnt out.

BACKGROUND OF THE INVENTION

A large number of welders that employ electromagnetic switches for turning on/off the input power thereto have been commercialized. The electromagnetic switch (hereinafter called "EM switch") can save waste power when the welder is not operated but at rest. The waste power is supposed to supply an exciting current to a main transformer and the like although the welder is at rest.

A conventional welder employing an EM switch that turns on/off the input power thereof is described with reference to FIG. 6. FIG. 6 illustrates an essential part of a circuit that controls turning on/off of an EM switch, and FIG. 6 also shows connections between the circuit and the main transformer for welding, as well as the EM switch respectively.

In FIG. 6, a main transformer 1 of the welder is coupled to three input terminals R, S and T of three-phase alternate current via three contacts MSa of an EM switch. The two input terminals (S and T in FIG. 6) are connected to a power control switch 2. A control circuit of the EM switch is formed on a secondary side of the power control switch 2. Between the two bus lines 3 and 4 of the secondary side of the power control switch 2, a contact Ta of an off-delay timer T and a coil of the EM switch MS are connected in series. A coil of the off-delay timer T and a contact CR1a-1 of a control relay CR are connected in series also between the two bus lines 3 and 4. Further, independent of this circuit, a welding control circuit 9 is formed by connecting a contact of a starter switch TS, a coil of a control relay CR1 and a power supply 8 in series.

Operations of these circuits shown in FIG. 6 are described hereinafter. When the starter switch TS is turned on, the control relay CR1 is energized and turned on. (The starter switch is, in general, mounted to a welding torch as a trigger or the like, and is thus called a torch switch.) Since the contact CR1a-1 of the control relay CR1 is serially connected to the coil of the off-delay timer T, which is energized and turned on, then the contact Ta of the timer T is closed, whereby the coil of the EM switch MS is energized and turned on. The three contacts MSa are closed in unison to supply power to the main transformer of the welder to start welding. When the starter switch TS is turned off, the coil CR1 is deenergized, and its contact CR1a-1 is opened immediately, which deenrgizes the coil of off-delay timer T. However, the contact Ta of off-delay imer T is characterized by a delay at opening (OFF), thus the contact Ta is opened after a given time, and deenergizes the coil of the EM switch MS.

Then, the three contacts MSa are opened immediately and cut off supplying power to the main transformer.

As such, the EM switch MS is automatically deenergized after a given time. A circuit incorporating this function is called, in general, an energy saving circuit (the circuit "6" in FIG. 6). The turn-off of EM switch MS is delayed from that of starter switch TS. If this delay following the turn-off of starter switch TS is not available, the EM switch MS could be turned off while welding arc still remains. If this turn-off happens while welding arc still remains, the contact MSa cuts off a large amount of current, thereby to shorten the life of contact MSa. Therefore, as detailed above, the EM switch MS is turned off after a given time of the turn-off of switch TS. This delay time takes generally several minutes. The circuit constructed as above works well as far as a normal voltage is applied to the coil of the EM switch MS; however, when the voltage applied to the coil is abnormally lowered with some reason, the coil of EM switch sometimes encounters being burnt out.

FIG. 7 illustrates one of the reasons why the applied voltage is lowered abnormally. In FIG. 7, a three-phase parallel load 10 besides the main transformer is connected to the power supply. The coil of the EM switch MS is connected between R phase and S phase. If the S phase in this three-phase power supply becomes an "open phase", no voltage is supplied from S phases. However, a detour circuit shown with a heavy line in FIG. 7 is formed, and this circuit applies a voltage between R and S phases by connecting the coil of EM switch MS with one of the phases of the parallel load 10 serially. A voltage applied across R phase to T phase is split according to an inner impedance ratio of the EM switch coil vs. one phase of parallel load 10. The voltage applied to the EM switch coil is abnormally low because one of these split voltages is applied to this coil.

FIG. 8 illustrates a relation between the voltage applied to the EM switch coil and the current running through this coil. When the voltage (hereinafter called "coil voltage") increases, the current (hereinafter called "coil current") also increases. The EM switch MS turns on not before the coil voltage reaches the turn-on voltage "Eon", and then the contact MSa is turned on. Once the EM switch MS turns on, the coil current decreases sharply, however, the coil current just before the EM switch MS turns on reaches to as much as several times of the rated current value "P" (approximately 7 times in the example shown in FIG. 8.) Therefore, as shown in FIG. 8, when a normal voltage is not applied to the EM switch coil due to the open phase of "S" phase, the coil voltage cannot reach to the turn-on voltage "Eon". The current as much as several times of the rated current value "P" is thus kept running through the coil while the EM switch MS is left not being turned on. When such an abnormally large coil-current is kept running, the EM switch coil starts being burnt in several minutes or so.

SUMMARY OF THE INVENTION

The present invention addresses the above problem and aims to provide a welder that can prevent the EM switch coil from being burnt out when a coil current abnormally lowers for some reason.

A welder utilized in a first exemplary embodiment comprises the following elements:
 (a) an electromagnetic switch (EM switch);
 (b) a control circuit which gates the EM switch with a starter signal of the welder; and
 (c) a self-holding circuit for holding the EM switch by itself.

The self-holding circuit releases the EM switch from self-holding when the voltage applied to the control circuit lowers to not more than a turn-off voltage.

The control circuit of welder of the first exemplary embodiment includes a branch circuit, which turns on the EM switch, closing itself by synchronizing with a turn-on of a starter signal of the welder and opening itself after a given time.

A welder utilized in a second exemplary embodiment comprises the following elements:

(a) an electromagnetic switch (EM switch); and
(b) a control circuit which gates the EM switch with a starter signal of the welder.

The EM switch cuts off the coil-current by itself when a coil temperature rises to not less than a given value.

The EM switch of the present invention comprises the following elements:

a contact;

a coil driving the opening/closing of the contact;

a thermal sensor disposed nearby the coil, and sensing a temperature of the coil; and coil-current cut-off means for cutting off coil-current when the thermal sensor senses a coil temperature not less than a given value.

According to the first exemplary embodiment, when the voltage of the control circuit gating the EM switch lowers to not more than the turn-off voltage, the self-holding property of the EM switch is compulsorily removed so that no voltage can be applied to the EM switch coil. This structure prevents the coil from being burnt out due to abnormal voltage drop, and assures a highly reliable welder for users.

According to the second exemplary embodiment, the EM switch senses the temperature of its coil, and when the temperature rises to as high as exceeding a given temperature, the EM switch can cut off the coil-current by itself. Therefore, when the voltage of the control circuit gating the EM switch lowers to not more than the turn-off voltage, the coil-current is cut off, thereby avoiding burning out the coil. As a result, a highly reliable welder is obtained.

DESCRIPTION OF PREFERRED EMBODIMENTS

Exemplary Embodiment 1

Figure 1:
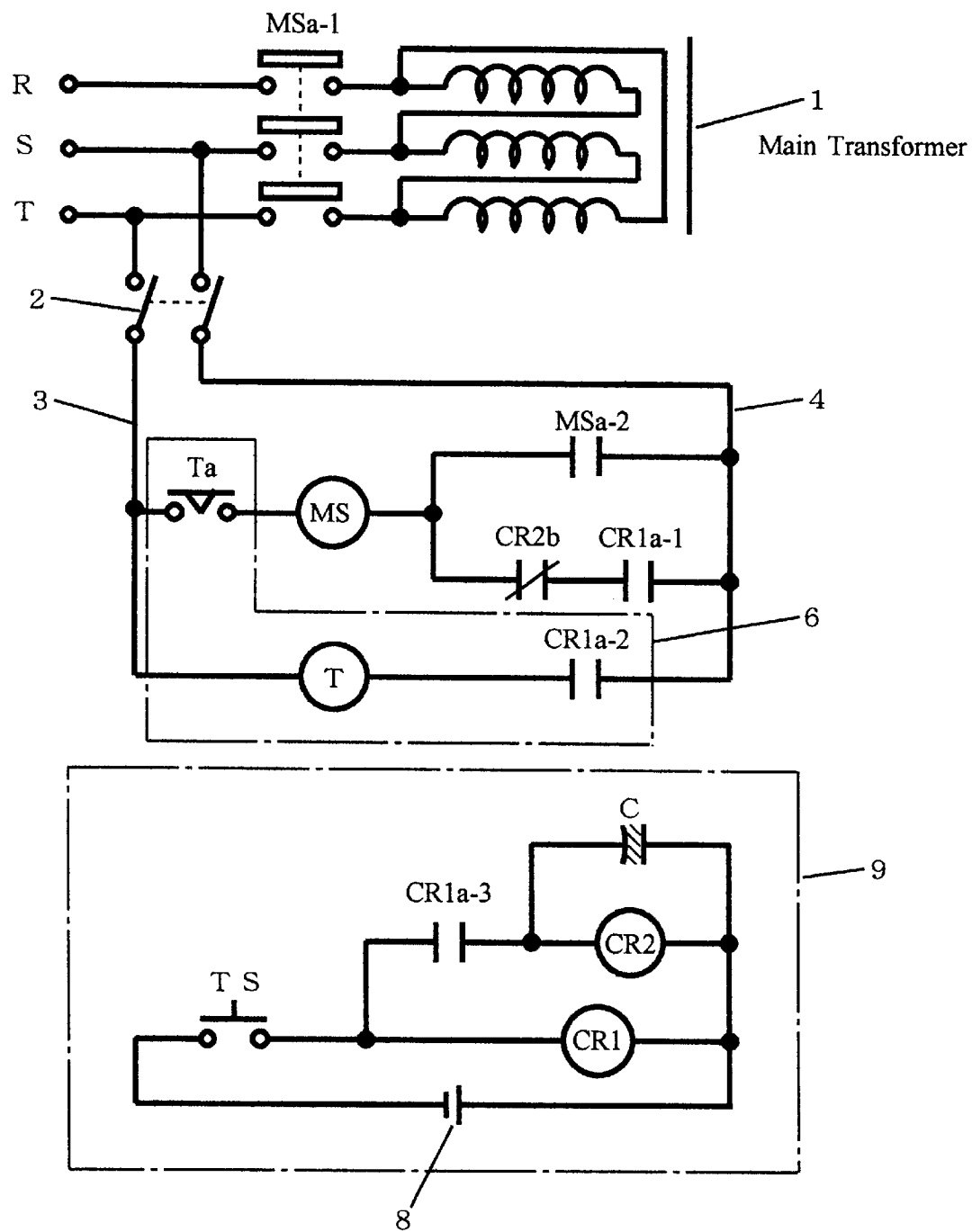
FIG. 1 is a circuit diagram for gating an EM switch utilized in a first exemplary embodiment of the present invention.

The first exemplary embodiment of the present invention is described with reference to FIG. 1. The circuit diagram shown in FIG. 1 includes a main transformer receiving a three-phase ac input, an electromagnetic switch (EM switch) gating the primary side of the main transformer, and a control circuit gating the EM switch.

Each phase of the main transformer is coupled to the three-phase power supply via three contacts Msa-1 of the EM switch. One phase out of three-phases of the power supply powers the control circuit of the EM switch via the power control switch 2. On a secondary side of the power control switch 2, the following elements are connected in series:

a contact Ta of an off-delay timer T;

a coil of the EM switch;

a "b" contact CR2b of a relay CR2 (normally closed contact); and an "a" contact CR1a-1 of a relay CR1.

This series circuit is connected between the bus lines 3 and 4 of the secondary side of control power switch 2. A "a" contact Msa-2 of the EM switch MS is connected in parallel to both of the "b" contact CR2b and the "a" contact CR1a-1. The series circuit of the off-delay timer coil T and the "a" contact CR1a-2 is connected between the bus lines 3 and 4.

A circuit 9 activates welding by using a starter switch TS, and the circuit 9 comprises the following elements connected in series and forms a closed circuit:

the starter switch TS;

a coil of the relay CR1; and a dc power supply 8.

The coil of relay CR1 in this series circuit is connected in parallel with another series circuit comprising the "a" contact CR1a-3 of relay CR1 and the coil of relay CR2. Further, a capacitor C is connected in parallel with the coil of relay CR2.

In the circuit constructed as above, when the starter switch TS is turned on, the relay CR1 is energized and the contacts CR1a-1, CR1a-2 and CR1a-3 are closed in unison. The closing of CR1a-2 energizes the off-delay timer T, and its contact Ta is closed. The closing of both the contacts CR1a-1 and Ta energizes the EM switch MS, and its three contacts Msa-1 and Msa-2 are closed in unison. At this time, since the coil of relay CR2 is coupled to the capacitor, a voltage applied to the coil delays in rising, and the contact CR2b thus is activated with slight delay after the relay contact CR1a-3 is closed. The "b" contact CR2b, which is connected in series to the EM switch MS, is normally closed, and thus the circuit opens not before the relay CR2 works. As a result, the serial circuit of the contacts CR1a-1 and CR2b is opened; however, the EM switch MS is left being energized because the contact Msa-2 of the EM switch MS is connected to this serial circuit. In other words, the EM switch MS is kept in self-holding status, i.e. its own contact Msa-2 energizes its own coil.

In this status, when the starter switch TS is turned off, the relay CR1 is deenergized immediately, and its contacts CR1a-1, CR1a-2 and CR1a-3 are opened in unison. The opening of CR1a-2 deenergizes the off-delay timer T, and its contact Ta is opened with a given time delay. The contact Ta is opened, whereby the EM switch MS is deenergized, and every contact Msa-1 and Msa-2 of the switch is turned off in unison. The power supplying to the main transformer is cut off due to the turn-off of contact Msa-1, and whereby the welding is completed. The opening of contact Msa-2 releases the EM switch MS from the self-holding. Since the capacitor C is connected in parallel with the coil of relay CR2, the relay CR2 is released with some delay after the starter switch 2 is turned off.

Figure 2:
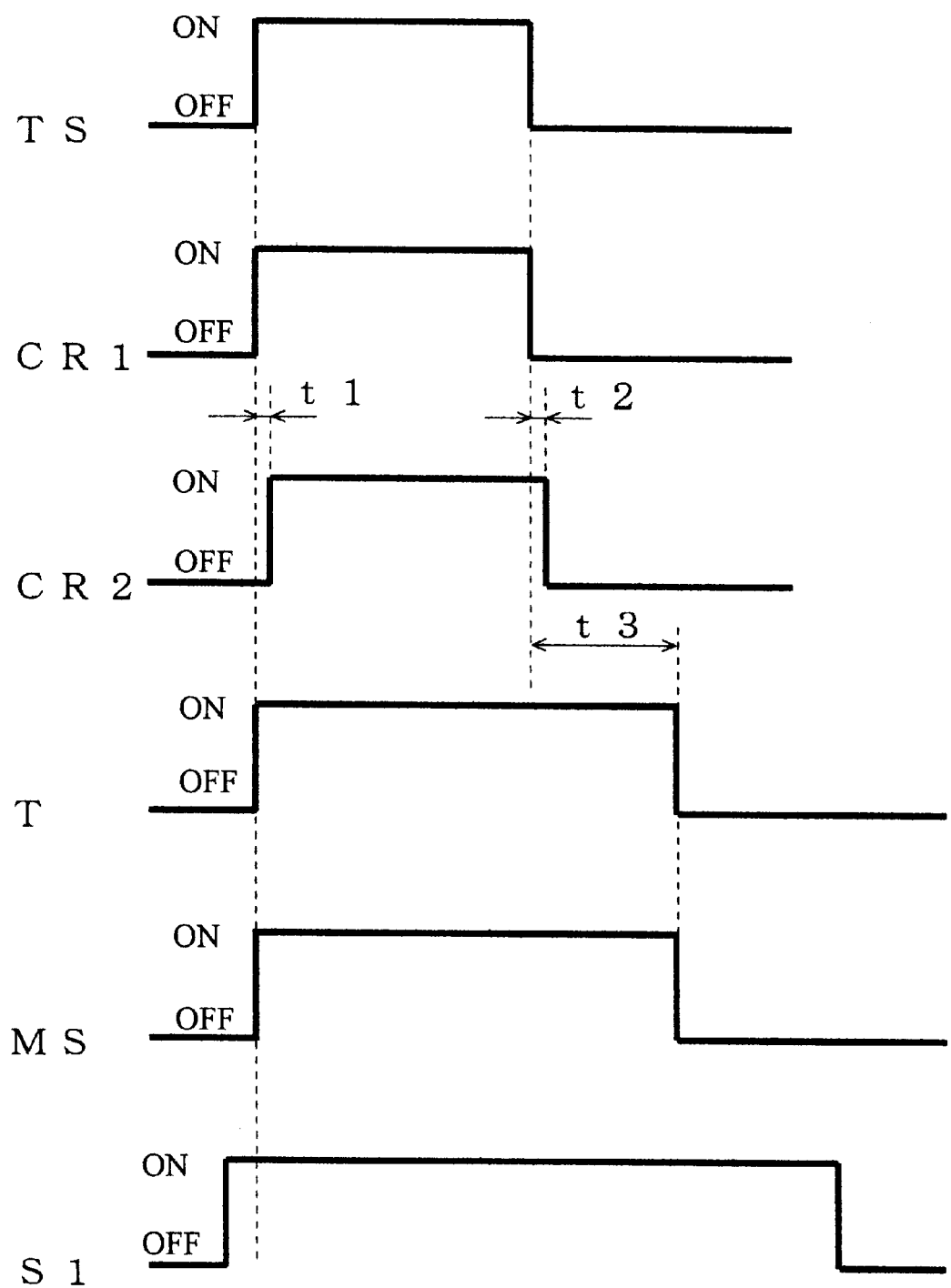
FIG. 2 is a timing chart illustrating the first exemplary embodiment.

The above description refers to a case where the circuit operates normally with a normal voltage. FIG. 2 is a timing chart illustrating the "turn-on and turn-off" timings of the switches, relays, timer and EM switch. In FIG. 2, a power control switch S1 has been turned on. When the starter switch TS is turned on, the relay CR1, off-delay timer T and EM switch MS are closed in unison, and the relay CR2 is turned on with a delay of "t1". This delay of "t1" is produced by the capacitor C. During this "t1" period, the series circuit of contacts CR1a-1 and CR2b is closed, and a voltage is applied to the coil, whereby the EM switch MS is turned on.

Also after the time "t1" lapses, the EM switch MS is retained by its own contact MSa-2. The relay CR1 is turned off immediately after the contact of starter switch TS is opened, then the relay CR2 is turned off after "t2" lapses. The delay "t2" is produced by the capacitor C. After a given time "t3" of turn off of starter switch TS, the contact Ta of off-delay timer T is opened. This delay time "t3" is produced by a delay characteristic of the timer T, and this delay time "t3" can avoid supplying waste power to the main transformer 1 when the welder is at rest. The delay time "t3" is thus called "energy saving time".

Next, a case where a supplied voltage lowers abnormally is described hereinafter. For example, as is described in the background of the invention, assume that one phase out of three-phase of the power supply becomes an open phase, whereby the voltage of control circuit lowers abnormally.

The voltage of control circuit lowers before the starter switch TS is turned on, and the voltage does not reach to the turn-on voltage of the EM switch MS. In this case, the relay CR1 is energized just after the starter switch TS is turned on, the contact CR1a-2 of relay CR1 is thus closed, whereby the off-delay timer T is energized. When the voltage of control circuit is too low to turn on the off-delay timer T, its contact Ta is not closed and thus the EM switch MS is never energized. When the voltage of control circuit does not reach to the turn-on voltage of the EM switch MS, however, the off-delay timer T reaches thereto, the off-delay timer is turned on, and the contact Ta is closed. When the contact Ta is closed, a voltage is applied to the coil of EM switch MS because the contact CR1a-1 has been closed already. However, the EM switch MS does not reach to the turn-on voltage, the EM switch MS is not turned on. In this situation, excessive current runs in the EM switch MS as described in the background of the invention, the coil is burnt out if this situation is left as it is.

In the welder utilized in this first exemplary embodiment of the present invention, when the starter switch TS is turned on, the relay CR2 is turned on with a delay of "t1" after the relay CR1 is turned on. Since the contact CR2b of this relay CR2 is connected in series with the contact CR1a-1 of relay CR1, the series circuit of contacts CR1a-1 and CR2b is opened due to the closing of relay CR2. Therefore, an insufficient voltage is once applied to the coil of EM switch MS, however, the energizing of the coil due to this insufficient voltage is released by the turn-on of relay CR2. As a result, the EM switch MS avoids being burnt out.

After the EM switch MS is once turned on, the voltage of control circuit lowers abnormally to as low as not more than the turn-on voltage. This situation is described hereinafter. When the EM switch MS has been turned on, the switch is turned off when the voltage lowers to not more than the turn-off voltage. When the time "t1" lapsed after the starter switch is closed, only the contact MSa-2 holds the EM switch MS. Therefore, when the contact MSa-2 is opened, the coil of EM switch MS is deenergized. The EM switch MS thus can avoid being burnt out. Even if the time "t1" does not lapse yet after the starter switch TS is closed, the series circuit of contacts CR1a-1 and CR2b is immediately opened because the time "t1" is a short period. As a result, the energizing due to an insufficient voltage on the coil of EM switch is deenergized. After the EM switch is turned off, even if the starter switch remains on, since the contact CR2b is opened while the contact CR1a-1 is closed, a voltage is never applied to the coil of EM switch MS. The series circuit of contacts CR1a-1 and CR2b is closed only during the time "t1" just after the starter switch TS is turned on and never turned on other periods. When the control circuit restores a normal voltage, the coil of EM switch is never applied with a voltage unless the starter switch is once turned off and then turned on.

Figure 3:
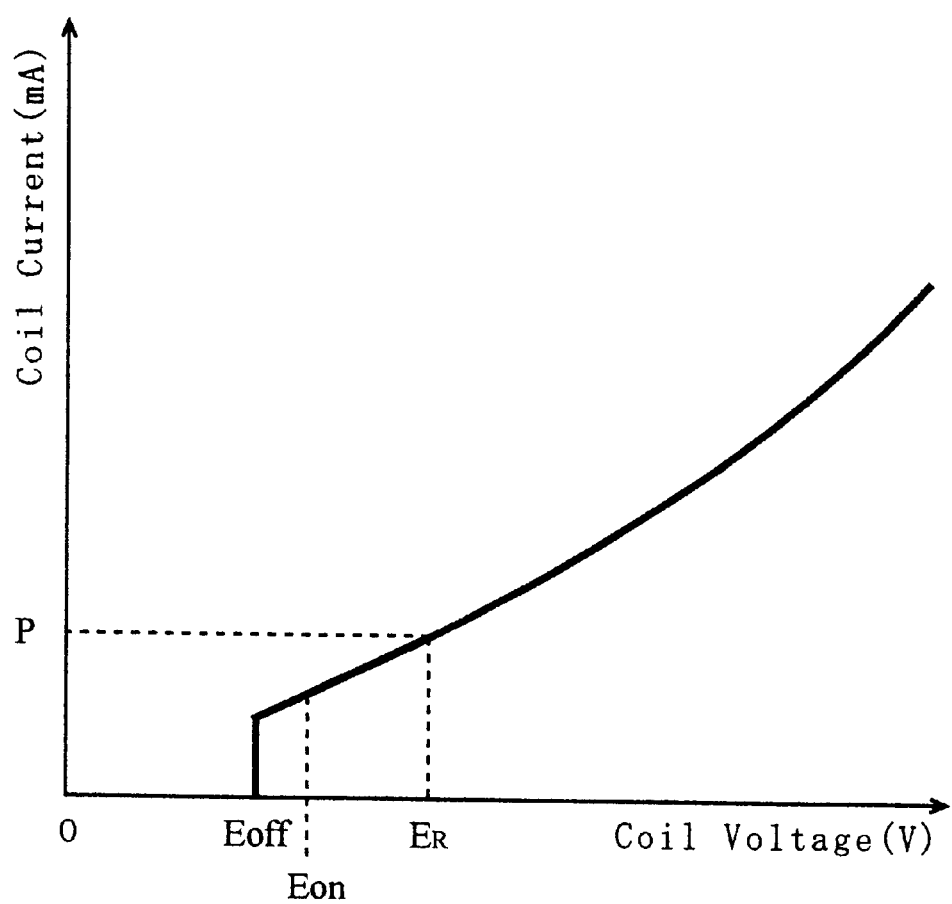
FIG. 3 illustrates a relation between a coil voltage and a coil current of the EM switch in the first exemplary embodiment of the present invention.
Figure 8:
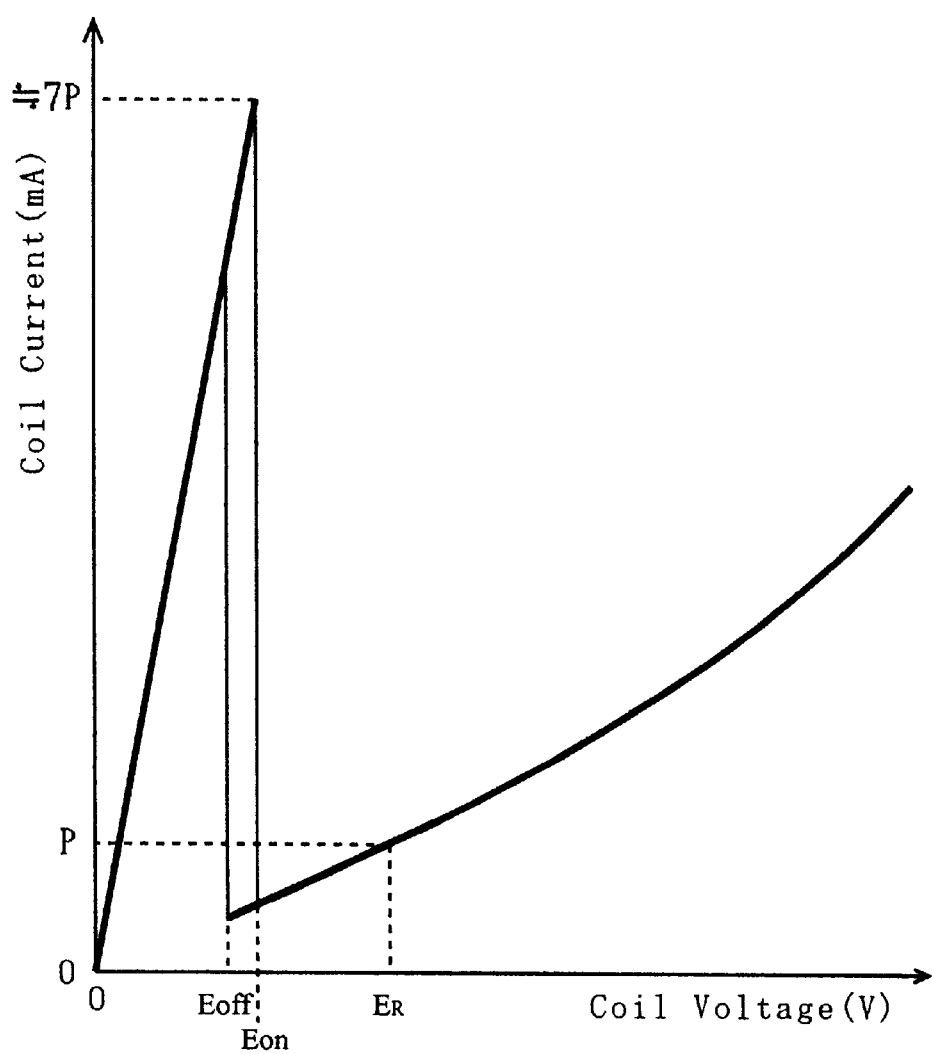
FIG. 8 illustrates a relation between a coil voltage and a coil current of EM switch of the conventional welder.

FIG. 3 illustrates a relation between a coil voltage and a coil current of the EM switch in the first exemplary embodiment of the present invention. In FIG. 3, when the coil voltage is lowered step by step from the value substantially near to the rated voltage ER, the coil-current is also decreased gradually. When the voltage lowers to the turn-on voltage Eon, the EM switch MS still keeps being on; however, when the voltage lowers down to a 10 turn-off voltage Eoff, the EM switch MS is turned off. At the same time, the voltage applied to the coil of the EM switch MS is removed. Therefore, an excessive current, as shown in FIG. 8 illustrating a conventional case, does not run through the coil.

Figure 4:
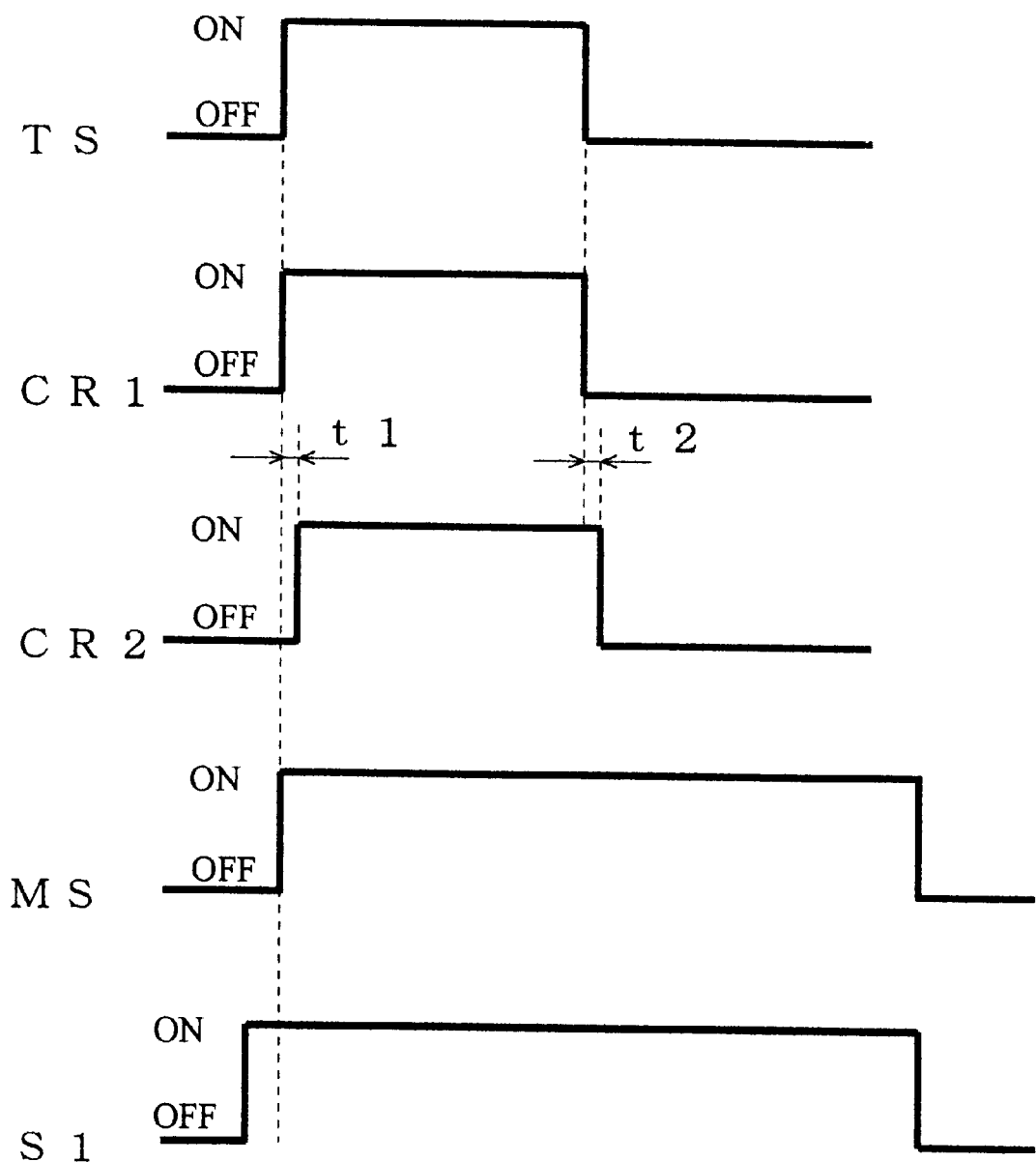
FIG. 4 is a timing chart where an energy saving circuit is omitted from the first exemplary embodiment.

FIG. 4 is a timing chart where an energy saving circuit is omitted from the first exemplary embodiment, namely, the turn-on and turn-off timings of the switches, relays and EM switch of a circuit modified from that shown FIG. 1. The modified circuit diagram is not shown here, but it is just this: the following elements are deleted from the circuit diagram shown in FIG. 1 and a first end of the coil of EM switch MS is directly connected to the bus line 3.

Deleted elements: off-delay timer T;

contact Ta; and contact CR1a-2

In such a modified circuit, when the starter switch TS is turned on, the relay CR1 and the EM switch MS are turned on in unison, and yet, the relay CR2 is turned on with a delay of "t1" because of the capacitor C. The series circuit of contacts CR1a-1 and CR2b is closed just during the period of this delay time "t1", and the EM switch MS is turned on during this period. After the delay time "t1" lapses, the EM switch MS is held by the contact Msa-2.

The relay CR1 is turned off just after the starter switch TS is turned off, and the relay CR2 is turned off after the lapse of time "t2" that is produced by the capacitor C. Since this modified circuit does not have an energy saving circuit 6, the EM switch MS remains on as long as the power control switch 2 is turned on.

As such, in the circuit having no energy saving circuit, the EM switch MS is held only by the contact MSa-1 after the delay time "t1" lapses from the turn-on of the starter switch TS. Therefore, when the voltage applied to the EM switch MS lowers abnormally, and the switch is once turned off, the EM switch MS is never turned on again unless the starter switch is turned off and then turned on again.

The above first exemplary embodiment proves that the welder of the present invention can prevent the EM switch from being burnt even if this switch encounters an abnormal voltage drop at any time. As a result, the reliability of the welder is extremely improved.

Exemplary Embodiment 2

The second exemplary embodiment is described with reference to FIG. 5. The circuit diagram in FIG. 5 includes the following elements;

(a) a main transformer receiving input power from a three-phase ac power supply;

(b) an EM switch gating a primary side of the main transformer; and (c) a control circuit gating the EM switch.

The same elements as shown in FIG. 1 are denoted with the same marks as used in FIG. 1.

Each phase of the main transformer is coupled to the three-phase power supply via three contacts Msa-1 of the EM switch. One phase out of three-phases of the power supply powers the control circuit of the EM switch via the control power switch 2. A first end of thermal sensing contact ThP is connected to one of the bus line 3 or 4 (bus line 4 is used in this exemplary embodiment) on the secondary side of the power control switch 2. The second end of the thermal sensing contact ThP is connected to a bus line 5.

Between the bus lines 3 and 5, the contact Ta of off-delay timer T and the coil of EM switch MS are connected serially. The coil of the off-delay timer T and the contact CRA-1 of a control relay CR1 are connected in series between also the bus lines 3 and 5. Further, independently of the above circuit, a contact of starter switch TS, a coil of control relay CR1 and a power supply 8 are connected in series to form a welding control circuit 9.

Figure 5:
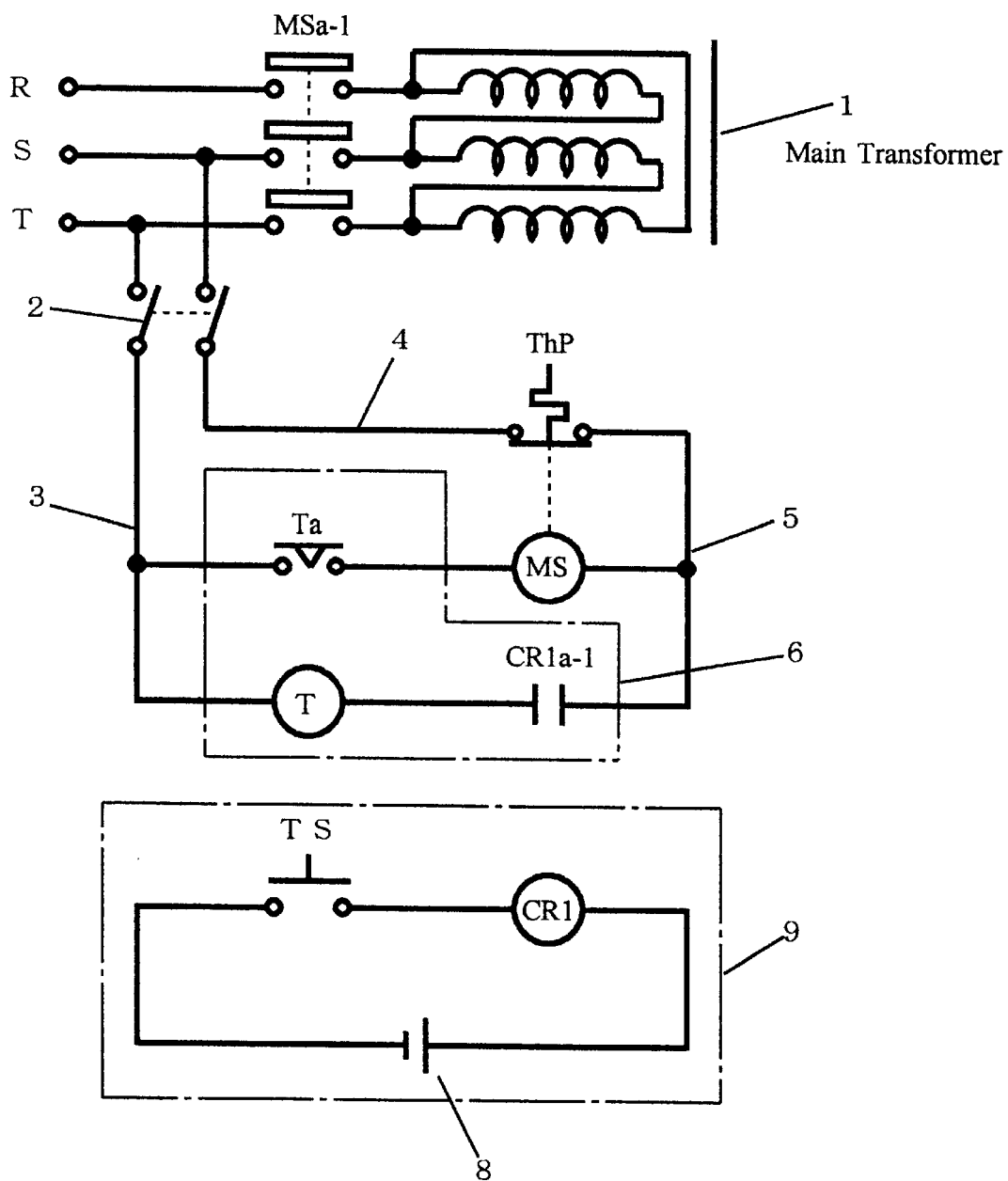
FIG. 5 is a circuit diagram for gating an EM switch utilized in a second exemplary embodiment of the present invention.
Figure 6:
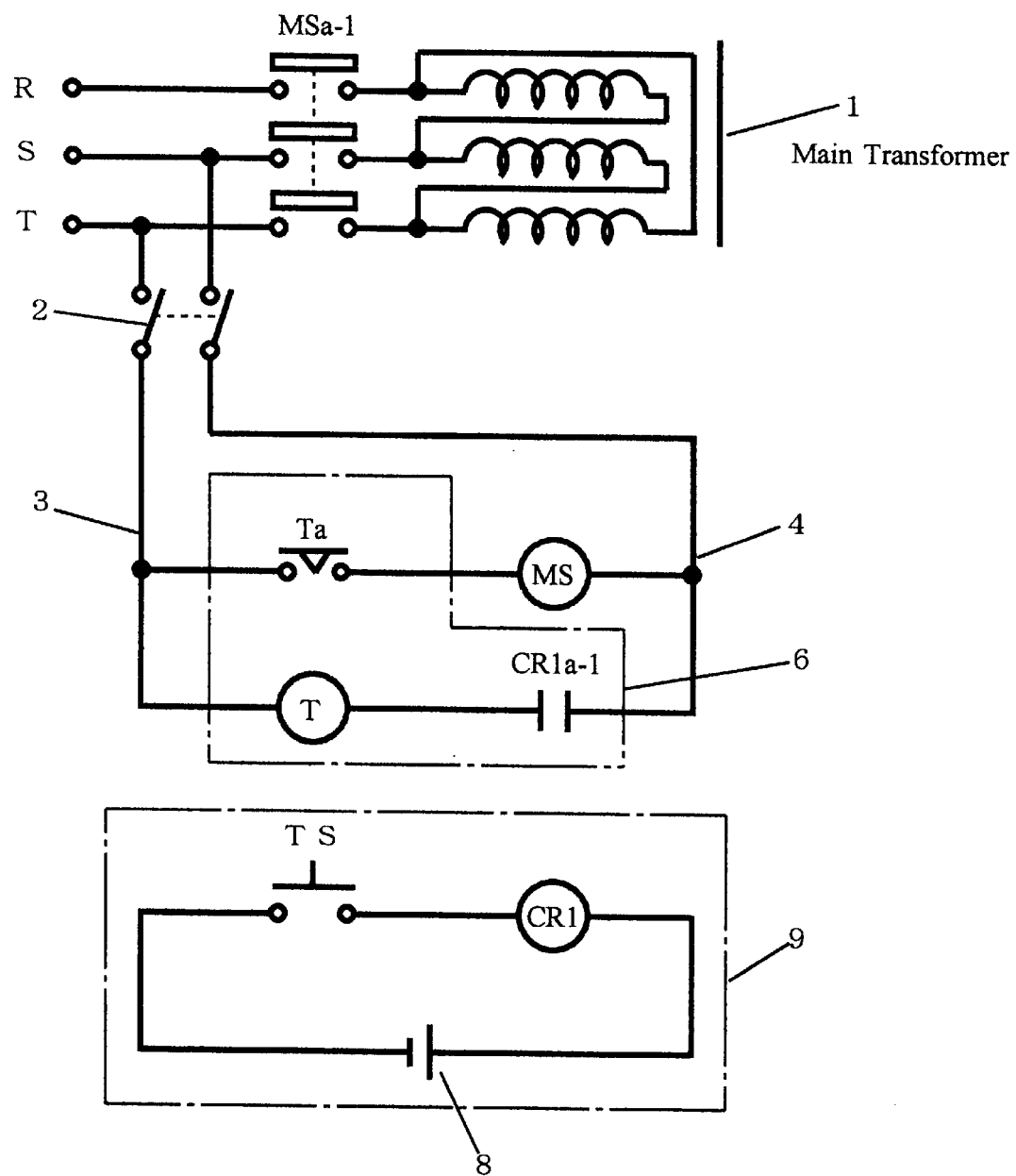
FIG. 6 is a circuit diagram for gating an EM switch employed in a conventional welder.
Figure 7:
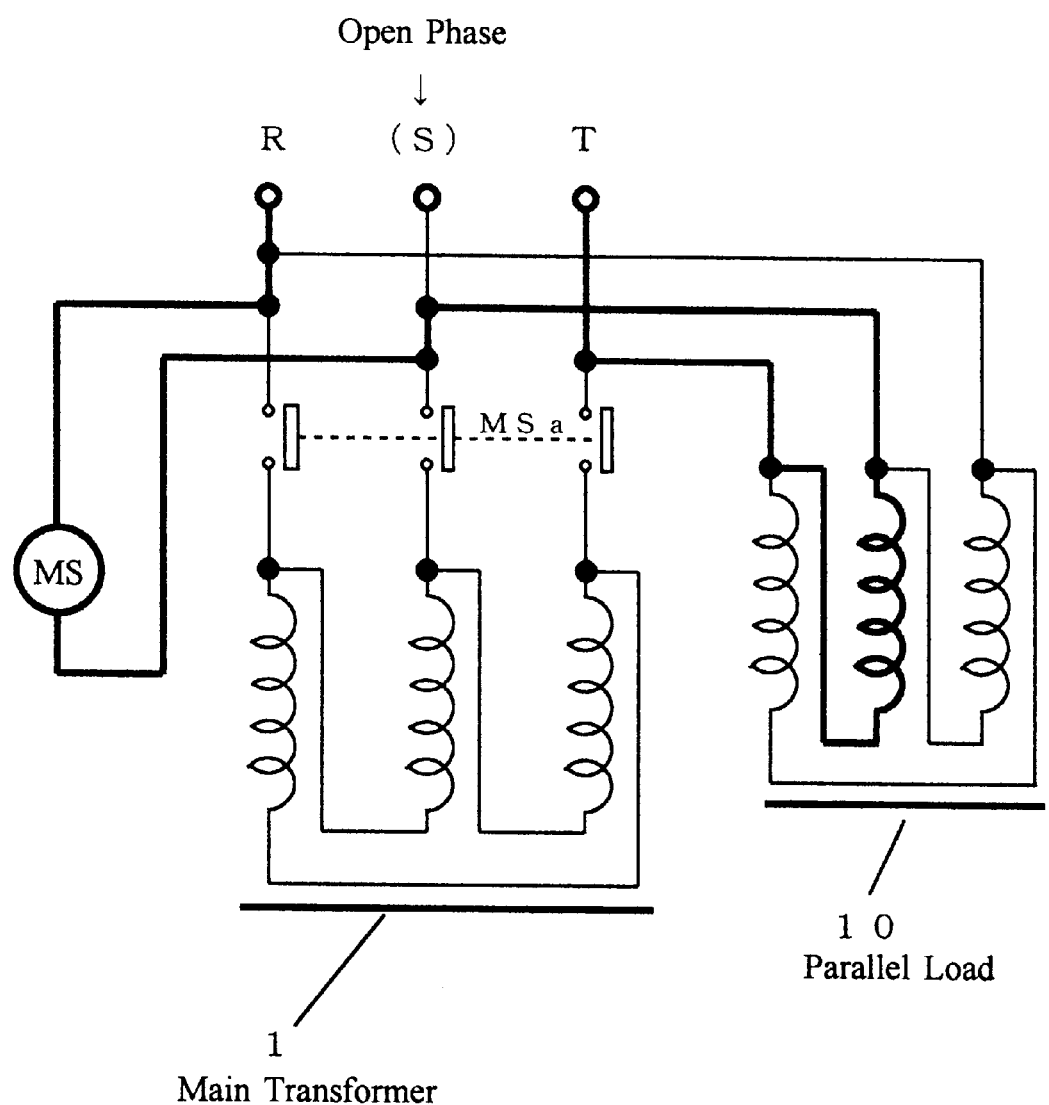
FIG. 7 shows a detour circuit appearing when one phase of a three-phase input becomes an open phase.

An operation of the circuits shown in FIG. 5 is described hereinafter. The basic operation is the same as that of the conventional welder shown in FIG. 6. That is to say, when the starter switch TS is turned on, the control relay CR1$a$-1 is energized and turned on. Since the contact CR1$a$ of control relay CR1 is connected in series with the coil of off-delay timer T, the off-delay timer T is energized and turned on, then its contact Ta is closed. The coil of EM switch MS is energized by this closing. Then, three contacts MSa-1 of the EM switch MS are closed in unison, whereby the main transformer is powered, and the welding is started. When the starter switch is turned off, the coil CR1 of control relay is deenergized, and its contact CR1$a$-1 is opened immediately. The coil of off-delay timer T is deenergized because the contact CR1$a$-1 is opened. However, its contact Ta is opened after a given delay time because the contact Ta has a delaying characteristic in opening. This opening deenergizes the coil of the EM switch MS. This deenergizing opens the three contacts MSA-1 immediately and cuts off the power supplied to the main transformer 1.

The above description refers to a case where a normal voltage is applied to the control circuit. The following description refers to a case where a voltage supplied to the control circuit lowers abnormally. The thermal sensing contact ThP is an element that can turn off a circuit when it senses a higher temperature than a given value. This contact ThP is disposed nearby the coil of EM switch in order to detect a temperature of this coil. Assume that the voltage applied to this coil lowers abnormally for some reason, in such a case, current of as much as several times a current corresponding to a rated voltage is applied, runs in the coil, which was described already using FIG. 8. A coil temperature is going to rise sharply; however, in the welder utilized in this second exemplary embodiment, the thermal sensing contact ThP senses this temperature rise, and opens the contact ThP itself, whereby the voltage applied to the coil of EM switch MS is cut off. As a result, this coil can avoid being burnt out.

As such, the second exemplary embodiment proves that the welder of the present invention can prevent at low cost and for sure the EM switch from being burnt out when the voltage applied to the coil of EM switch lowers abnormally for some reason.

What is claimed is:

1. A welder comprising:

an electromagnetic switch electrically connected to said welder and operable to gate power to be supplied to said welder, said electromagnetic switch having a turn-off voltage at or below which said electromagnetic switch opens, said electromagnetic switch including a self-hold switch electrically connected to said electromagnetic switch such that said self-hold switch closes when said electromagnetic switch is activated;

a control circuit electrically connected to said electromagnetic switch, and having an operating voltage, and operable to control activation of said electromagnetic switch based on a welder start signal, said control circuit including a branch circuit operable to close in synchronization with the welder start signal so as to activate said electromagnetic switch and operable to open a predetermined time after the welder start signal; and a self-holding circuit, electrically connected to said electromagnetic switch and said control circuit, operable to hold said electromagnetic switch closed via said self-hold switch when said electromagnetic switch is activated, and to open said self-hold switch when the operating voltage of said control circuit lowers to not more than the turn-off voltage of said electromagnetic switch so as to allow said electromagnetic switch to open.

2. A welder comprising:

an electromagnetic switch electrically connected to said welder and operable to gate power to be supplied to said welder, said electromagnetic switch having a turn-off voltage at or below which said electromagnetic switch opens, said electromagnetic switch including a self-hold switch electrically connected to said electromagnetic switch such that said self-hold switch closes when said electromagnetic switch is activated;

control means, having an operating voltage, for controlling activation of said electromagnetic switch based on a welder start signal, said control means including branch means for applying current to said electromagnetic switch for a predetermined time after the welder start signal so as to activate said electromagnetic switch and for blocking current from flowing through said branch means to said electromagnetic switch after the predetermined time; and self-holding means for holding said electromagnetic switch closed via said self-hold switch when said electromagnetic switch is activated, and for opening said self-hold switch when the operating voltage of said control means lowers to not more than the turn-off voltage of said electromagnetic switch so as to allow said electromagnetic switch to open.

3. A welder comprising:

an electromagnetic switch electrically connected to said welder and operable to gate power to be supplied to said welder, said electromagnetic switch including a coil, and a thermal sensing contact operable to sense the temperature of said coil and to open when the temperature of said coil is sensed to be not less than a predetermined value so as to cut off current running to said coil; and a control circuit, electrically connected to said electromagnetic switch, operable to control activation of said electromagnetic switch based on a welder start signal.

4. An electromagnetic switch comprising:

a contact operable to switch to an on-state and an off-state;

a coil operable to drive operation of said contact to the on-state and the off-state;

a thermal sensing element, disposed near said coil, operable to sense a temperature of said coil;

a current cut-off device, electrically connected to said coil and said thermal sensing unit, operable to cut off current running through said coil when said thermal sensing element senses a temperature not less than a predetermined value.

5. A welder comprising:

electromagnetic switch means for gating power to be supplied to said welder, said electromagnetic switch means including a coil, and thermal sensing means for sensing the temperature of said coil and for blocking current from reaching said coil when the temperature of said coil is sensed to be not less than a predetermined value; and control means for controlling activation of said electromagnetic switch means based on a welder start signal.

6. An electromagnetic switch comprising:

a contact operable to switch to an on-state and an off-state;

a coil operable to drive operation of said contact to the on-state and the off-state;

thermal sensing means for sensing a temperature of said coil;

current cut-off means for blocking current from running through said coil when said thermal sensing means senses a temperature not less than a predetermined value.

* * * * *